(12) United States Patent
Balthasar et al.

(10) Patent No.: US 11,724,286 B2
(45) Date of Patent: Aug. 15, 2023

(54) METHOD AND APPARATUS FOR DETECTING MATTER

(71) Applicant: TOMRA SORTING NV, Leuven (BE)

(72) Inventors: Dirk Balthasar, Boppard (DE); Tobias Hartmann, Koblenz (DE); John McGloughlin, County Kildare (IE); Douglas Alexander Reid, Dublin (IE)

(73) Assignee: TOMRA SORTING NV, Leuven (BE)

( * ) Notice: Subject to any disclaimer, the term of this patent is extended or adjusted under 35 U.S.C. 154(b) by 0 days.

(21) Appl. No.: 15/032,489

(22) PCT Filed: Nov. 3, 2014

(86) PCT No.: PCT/EP2014/073577
§ 371 (c)(1),
(2) Date: Apr. 27, 2016

(87) PCT Pub. No.: WO2015/063299
PCT Pub. Date: May 7, 2015

(65) Prior Publication Data
US 2016/0263624 A1 Sep. 15, 2016

(30) Foreign Application Priority Data
Nov. 1, 2013 (EP) .................................... 13191270

(51) Int. Cl.
*B07C 5/34* (2006.01)
*G01N 21/85* (2006.01)
(52) U.S. Cl.
CPC ........... *B07C 5/3416* (2013.01); *G01N 21/85* (2013.01); *B07C 2501/009* (2013.01); *G01N 2021/8592* (2013.01)

(58) Field of Classification Search
CPC ..... B07C 5/3435; B07C 5/342; B07C 5/3422; B07C 5/366; B07C 5/365; B07C 5/3416;
(Continued)

(56) References Cited

U.S. PATENT DOCUMENTS 3,709,598 A * 1/1973 Vandenberg ............ A61J 3/074
209/585
4,558,786 A * 12/1985 Lane ....................... B07C 5/342
209/558
(Continued)

FOREIGN PATENT DOCUMENTS

CN         2733343 Y     10/2005
CN       101034484 A      9/2007
(Continued)

OTHER PUBLICATIONS

English Translation of JP 04369439 A. (Year: 1992).*
(Continued)

*Primary Examiner* — Jeffrey A Shapiro
(74) *Attorney, Agent, or Firm* — Kagan Binder, PLLC

(57) ABSTRACT

An apparatus for detecting matter comprises bulk feeding means configured for feeding a plurality of objects into a detecting region; at least one light source having a focusing element and being configured for illuminating at least one object moving in an object plane in the detecting region; and a first light-analyzing apparatus arranged to sense light that has been transmitted through the object. In the associated method, the object is caused to move in the plane and the object is illuminated with incident light. Light that has been transmitted through the object and is falling in a measuring plane is detected, and an object-specific parameter based on the detected transmitted light is determined.

20 Claims, 4 Drawing Sheets

(58) Field of Classification Search
CPC ....... B07C 2501/009; G01J 3/465; G01J 3/50; G01N 21/85; G01N 2021/8592
USPC ................ 209/577, 580, 587, 638, 639, 644
See application file for complete search history.

(56) References Cited

U.S. PATENT DOCUMENTS

| | | | | |
|---|---|---|---|---|
| 4,630,736 | A * | 12/1986 | Maughan | B07C 5/366 209/581 |
| 4,825,068 | A * | 4/1989 | Suzuki | B07C 5/3422 250/223 R |
| 5,206,699 | A * | 4/1993 | Stewart | B07C 5/3425 209/577 |
| 5,352,888 | A * | 10/1994 | Childress | B07C 5/3425 209/586 |
| 5,808,305 | A | 9/1998 | Leidecker et al. | |
| 5,884,775 | A * | 3/1999 | Campbell | B07C 5/3422 209/581 |
| 6,056,127 | A * | 5/2000 | Low | B07C 5/02 209/580 |
| 6,191,859 | B1 * | 2/2001 | Winterbottom | B07C 5/342 209/580 |
| 6,512,577 | B1 * | 1/2003 | Ozanich | G01J 3/02 209/588 |
| 6,646,218 | B1 | 11/2003 | Campbell et al. | |
| 6,936,784 | B2 * | 8/2005 | Ogburn | G01N 21/85 209/576 |
| 7,041,926 | B1 * | 5/2006 | Gadberry | B07C 5/3425 209/576 |
| 7,763,820 | B1 * | 7/2010 | Sommer, Jr. | B07C 5/346 209/576 |
| 8,253,054 | B2 * | 8/2012 | Koehler | B07C 5/342 700/223 |
| 9,101,963 | B2 * | 8/2015 | Christel | B07C 5/3425 |
| 2002/0011567 | A1 * | 1/2002 | Ozanich | G01J 3/02 250/326 |
| 2002/0191184 | A1 * | 12/2002 | Luxem | G01V 8/14 356/369 |
| 2003/0201209 | A1 * | 10/2003 | De Baerdemaeker | G01N 3/405 209/576 |
| 2004/0095571 | A1 | 5/2004 | Bourely et al. | |
| 2005/0067332 | A1 * | 3/2005 | Ikeda | B07C 5/366 209/580 |
| 2007/0029232 | A1 * | 2/2007 | Cowling | B07C 5/3425 209/577 |
| 2007/0146718 | A1 | 6/2007 | Takase et al. | |
| 2007/0262002 | A1 * | 11/2007 | Ito | B07C 5/3425 209/580 |
| 2008/0302707 | A1 * | 12/2008 | Bourely | B07C 5/34 209/577 |
| 2009/0042310 | A1 * | 2/2009 | Ward | G01N 15/1404 436/154 |
| 2009/0161102 | A1 * | 6/2009 | Deppermann | G01N 21/253 356/303 |
| 2009/0261024 | A1 * | 10/2009 | Sommer, Jr. | G01N 23/06 209/589 |
| 2010/0020325 | A1 * | 1/2010 | Osaki | G01N 21/31 356/436 |
| 2010/0198397 | A1 * | 8/2010 | Berghmans | B07C 5/342 700/223 |
| 2010/0230330 | A1 * | 9/2010 | Afsari | B07C 5/363 209/680 |
| 2011/0228116 | A1 | 9/2011 | Margalith | |
| 2011/0297590 | A1 * | 12/2011 | Ackley | B07C 5/3412 209/580 |
| 2012/0132638 | A1 * | 5/2012 | Rey Garcia | H01L 21/67109 219/385 |
| 2012/0138514 | A1 * | 6/2012 | Janssens | G01N 21/21 250/225 |
| 2013/0056398 | A1 * | 3/2013 | Adams | B07C 5/342 209/587 |
| 2013/0278919 | A1 * | 10/2013 | Kawamura | G01N 21/31 356/51 |
| 2014/0054204 | A1 * | 2/2014 | Christel | B07C 5/36 209/587 |
| 2014/0056482 | A1 * | 2/2014 | Burgstaller | B07C 5/3422 382/110 |
| 2014/0091014 | A1 * | 4/2014 | Wagner | C12N 5/0612 209/579 |
| 2014/0284255 | A1 * | 9/2014 | Hug | B07C 5/342 209/587 |

FOREIGN PATENT DOCUMENTS

| | | | | |
|---|---|---|---|---|
| CN | 104067109 | A | 9/2014 | |
| EP | 0 772 498 | B1 | 2/2005 | |
| JP | 04369439 | A * | 12/1992 | ............... G01J 1/00 |
| JP | H06-222014 | A | 8/1994 | |
| JP | H09-196854 | A | 7/1997 | |
| JP | H10154794 | A | 2/1998 | |
| JP | H1190346 | A | 4/1999 | |
| JP | H11-218488 | A | 8/1999 | |
| JP | 2000292359 | A | 10/2000 | |
| JP | 2001-502804 | A | 2/2001 | |
| JP | 2004-529334 | A | 9/2004 | |
| JP | 2006 170669 | A | 6/2006 | |
| JP | 2007-033273 | A | 2/2007 | |
| JP | 2007-171027 | A | 7/2007 | |
| JP | 2007240315 | A | 9/2007 | |
| JP | 2008-018419 | A | 1/2008 | |
| JP | 2009-226248 | A | 10/2009 | |
| JP | 2010-110733 | A | 5/2010 | |
| JP | 2010-210355 | A | 9/2010 | |
| JP | 2012-525564 | A | 10/2012 | |
| JP | 2012-242340 | A | 12/2012 | |
| UA | 15857 | U | 7/2006 | |
| WO | 98/17406 | A1 | 4/1998 | |
| WO | 02/074457 | A1 | 9/2002 | |
| WO | 2010/124347 | A1 | 11/2010 | |
| WO | 2012/041285 | A2 | 4/2012 | |
| WO | 2013-001304 | A1 | 1/2013 | |
| WO | 2013/115650 | A1 | 8/2013 | |

OTHER PUBLICATIONS

International Search Report (PCT/ISA/210) dated Jan. 14, 2015, by the European Patent Office as the International Searching Authority for International Application No. PCT/EP2014/073577.
Written Opinion (PCT/ISA/237) dated Jan. 14, 2015, by the European Patent Office as the International Searching Authority for International Application No. PCT/EP2014/073577.
Written Opinion (PCT/IPEA/408) dated Oct. 9, 2015, by the European Patent Office as the International Preliminary Examining Authority for International Application No. PCT/EP2014/073577.
International Preliminary Report on Patentability (PCT/IPEA/409) dated Jan. 21, 2016, by the European Patent Office as the International Preliminary Examining Authority for International Application No. PCT/EP2014/073577.
Office Action (Preliminary Opinion (non-compliance with patentability requirements)) dated Mar. 6, 2018, by the Ukrainian Institute for Industrial Property in Ukrainian Patent Application No. A201604911, and an English Translation of the Office Action. (8 pages).
Office Action dated Mar. 21, 2018 by the State Intellectual Property Office of the People's Republic of China in corresponding Chinese Patent Application No. 2014800717027 (3 pages).
Office Action (Notification of the Second Office Action) dated Jan. 8, 2019, by the State Intellectual Property Office of the People's Republic of China in corresponding Chinese Patent Application No. 2014800717027, (3 pages).
Office Action (Notice of Reason(s) for Rejection) dated Oct. 2, 2018, by the Japanese Patent Office in corresponding Japanese Patent Application No. 2016-551009, and an English Translation of the Office Action, (7 pages).
Office Action (Notice of Reason(s) for Rejection) dated May 21, 2019, by the Japanese Patent Office in corresponding Japanese Patent Application No. 2016-551009, and an English Translation of the Office Action. (13 pages).

(56) References Cited

OTHER PUBLICATIONS

Office Action dated Mar. 3, 2020, by the Brazilian Patent Office in corresponding to Brazilian Patent Application No. BR112016009483-2 (3 pages).
Office Action (Communication pursuant to Article 94(3) EPC) dated Dec. 17, 2019, by the European Patent Office in corresponding European Application No. 14 793 109.1-1230, (4 pages).
Office Action (Second Examination Report/Notice of Decision) dated Apr. 26, 2020, by the Saudi Arabian Patent Office in corresponding Saudi Arabia Patent Application No. 516371041. (With Agents letter in English) (12 pages).
Office Action (Communication pursuant to Article 94(3) EPC) dated Jun. 25, 2020, by the European Patent Office n corresponding European Application No. 14 793 109.1-1230, (5 pages).
Office Action (Notice of Decision) dated Feb. 13, 2020, by the Saudi Arabian Patent Office in corresponding Saudi Arabia Patent Application No. 516371041. (8 pages).
Office Action (Notice of Reason(s) for Rejection) dated Jun. 22, 2021, by the Japanese Patent Office in corresponding Japanese Patent Application No. 2020-091189, and an English Translation of the Office Action. (15 pages).

\* cited by examiner

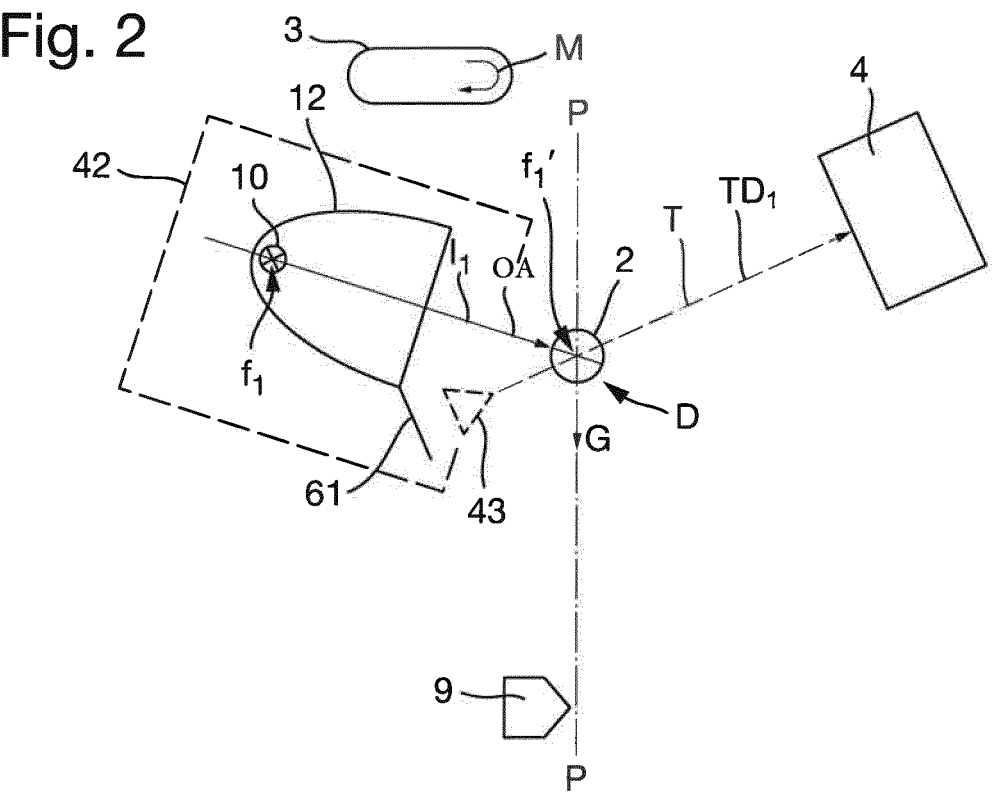
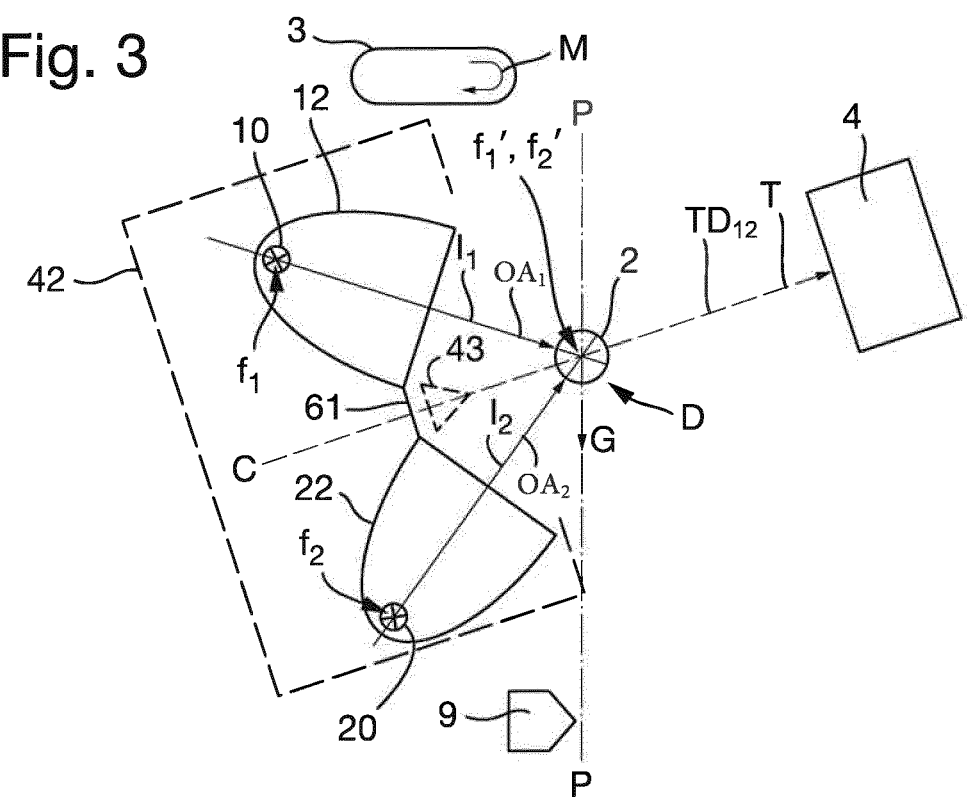

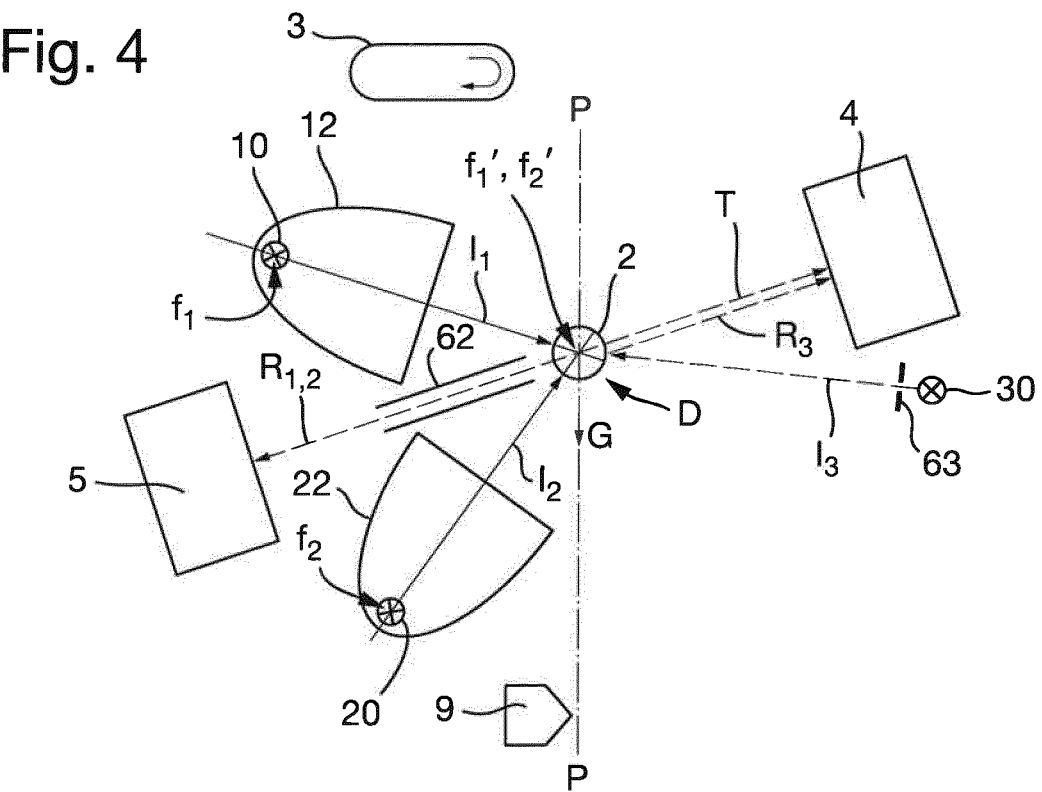
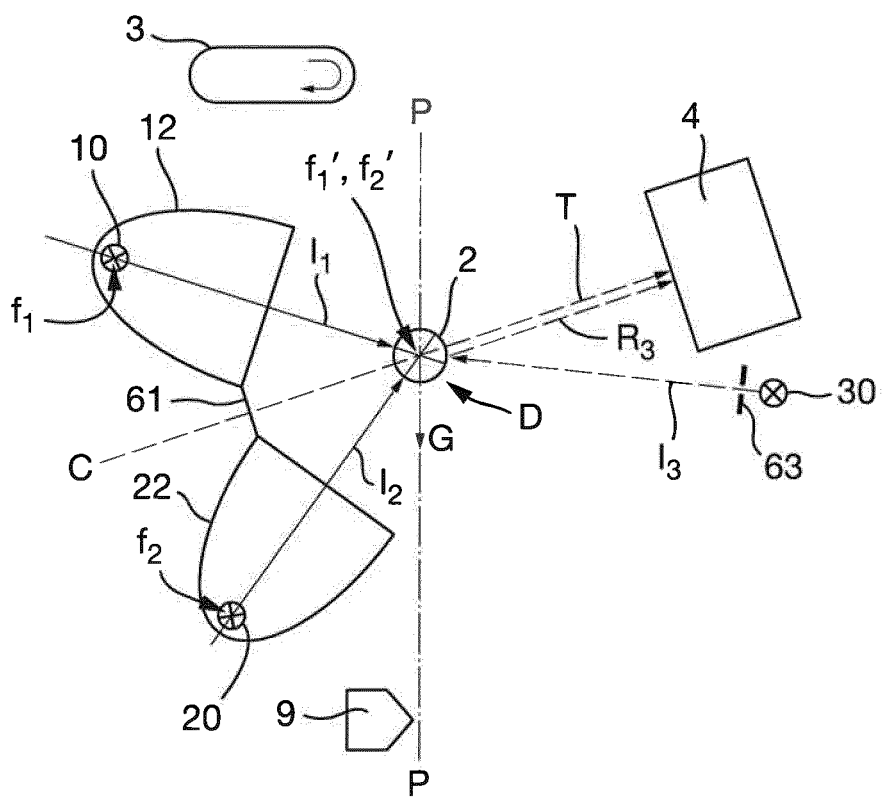

METHOD AND APPARATUS FOR DETECTING MATTER

FIELD OF THE INVENTION

The invention concerns systems and methods for non-destructive evaluation. More specifically, the invention concerns optical systems, devices and methods for detecting matter and for determining one or more parameters of an object. The invention is particularly useful for determining properties of one or more translucent objects.

BACKGROUND OF THE INVENTION

Various techniques exist for determining the quality of harvested fruit and vegetables. In the agriculture industry, it is of interest to grade the produce based on internal parameters such as sugar content, acidity, ripeness, rot and damage, and external features such as size, geometry and colour, and to perform certain sorting operations based on these parameters and features.

The use of near-infrared (NIR) spectroscopy and visible light (VIS) spectroscopy in determining various properties of harvested fruit and vegetables is well known. NIR radiation is commonly defined as the range of the electromagnetic spectrum between 780 and 2500 nm, while the spectrum between 400 nm and 780 nm is referred to as VIS radiation. In NIR or VIS spectroscopy, the object subjected to analysis is irradiated, and the reflected or transmitted radiation is measured. Changes in the reflected light are analysed to determine various characteristics of the surface of the object. Transmitted light, i.e. radiation that penetrates the object, is subjected to scattering and/or absorption which affect its wavelength. These changes depend on the light-scattering properties of the object, as well as its chemical composition.

The state of the art includes JP 2010 210355 A, which describes a method and an apparatus for performing non-destructive measurement of a concentration of a target component. In the method, a food item to be measured, such as a vegetable, fruit, meat, is irradiated with a light of wavelength in the range of 400 to 2500 nm. An absorbance spectrum is obtained by detecting the transmitted light and/or the reflected light, and the concentration of a target component of a measuring object is determined by using a calibration curve from the absorbance of all measuring wavelengths or a specific wavelength.

The state of the art also includes CN 2733343 Y, which describes an internal non-destructive integral analytical equipment for agricultural products such as fruit and vegetables, comprising a light source system, a filter and an imaging system. The equipment can light different agricultural products in different angles, and light permeating specimens can enter a spectrometer (light source is chromatic) or a detector (light source is monochromatic) as much as possible via lens imaging function for utilizing visible-near infrared spectroscopy to analyze the quality of the agricultural products.

In the known systems and methods, the objects are irradiated and analysed one by one, which requires that each object is placed inside the detector either manually or on a conveyor belt having designated receptacles for each object. It is thus desirable to increase the throughput of objects in the above mentioned devices.

SUMMARY OF THE INVENTION

The invention is set forth and characterized in the main claims, while the dependent claims describe other characteristics of the invention.

It is therefore provided an apparatus for detecting matter, characterized by:
 bulk feeding means configured for feeding a plurality of objects into a detecting region;
 at least one light source having a focusing element and being configured for illuminating at least one object moving in an object plane in the detecting region; and
 a first light-analyzing apparatus arranged to sense light that has been transmitted through the object.

According to one example there is provided an apparatus for detecting matter, characterized by:
 bulk feeding means configured for feeding a plurality of objects into a detecting region;
 at least one light source each having a focusing element and being configured send light in a respective first direction for illuminating at least one object moving in an object plane in the detecting region; and
 a first light-analyzing apparatus arranged to sense light that has been transmitted through the object, and to identify an amount of light that has been received from said at least one light source,
 wherein said first light-analyzing apparatus is arranged to sense light having a direction within the field-of-view of said first light-analyzing apparatus, and
 wherein said respective first direction is different from the directions within the field-of-view of said first light-analyzing apparatus.

In other words, when there is no object in the detection region, the light emitted or sent by said at least one light source will generally not be sensed by said first light-analyzing apparatus. In yet other words, when there is no object in the detection region, the light emitted or sent by said at least one light source will be sent outside the field of view of said first light-analyzing apparatus. In more detail, generally none or not more than a minor portion of the light sent from said at least one light source will be sensed by said first light-analyzing apparatus due to e.g. scattering in the ambient atmosphere or surface(s), when no object is present in the detection region. According to one example, at most 10% or at most 5% or at most 1% or at most 0.5% or at most 0.1% or at most 0.05% of the light sent from the at least one light source, when no object is present in the detection region, is identified by said first light-analyzing apparatus.

According to one example, when an object is present in the detection region and irradiated by said at least one light source, the light from said at least one light source is diffusely transmitted through or refracted by said object before it reaches the sensor of the light-analyzing apparatus. In more detail, more than 75% or more than 90% this light from said at least one light source light that reaches the sensor of said first light analyzing apparatus, has been diffusely transmitted through or refracted by said object before it reaches the sensor of the light-analyzing apparatus.

As is stated above, said first light-analyzing apparatus is arranged to identify light that has been received from said at least one light source; in other words said first light-analyzing apparatus is arranged to discriminate between ambient light and light which is received from the at least one light source. In yet other words, the amount of light that is received from said first light-analyzing apparatus is clearly higher than the noise level, which is present when the at least one light source is/are not switched off.

According to one example, the light source and focusing element has a resulting optical axis directed in a first direction. Said first direction being outside the field of view of said first light analyzing apparatus, in other words unrefracted light emitted along said first optical axis, is out-side the field of said first light-analyzing apparatus and will not be sensed by said first light-analyzing apparatus.

In one embodiment, the at least one light source is arranged to send incident light towards the plurality of objects that are moving in the object plane; and where the first light-analyzing apparatus is arranged such that a measuring plane for the transmitted light and the incident light are not in the same plane.

In one embodiment, the bulk feeding means are configured for feeding objects into the detecting region in a random fashion.

The at least one light source is in one embodiment arranged in the first focus of a truncated ellipsoid-shaped reflector, and the reflector is arranged such that the truncated ellipsoid-shaped reflector second focus is coinciding with the object plane.

In words, the light emitted from the at least one light source will first be converging to a focus, whereafter it will diverge. The light analyzing-apparatus is advantageously arranged such that the diverging light will not reach its sensor.

The at least one light source may comprise one or more light emitting diodes (LEDs), and may further comprise at least one lens, capable of focusing the light in the object plane.

In one embodiment, the light source and the first light-analyzing apparatus are arranged on opposite sides of the object plane. In one embodiment, a first light source is arranged symmetrically with a second light source about a central axis.

A second light-analyzing apparatus is in one embodiment arranged on the opposite side of the object plane with respected to the first light-analyzing apparatus and is configured to receive reflected light from the object resulting from light sent from the respective first and second light sources.

In one embodiment, at least a third light source is arranged on the same side of the object plane as the first light-analyzing apparatus and configured to irradiate the object with light that is reflected to the first light-analyzing apparatus.

The light-analyzing apparatus may comprise a spectroscopy system or a hyperspectral camera system.

The at least one light source is in one embodiment a pulsed light source, arranged to send pulsated light into the detecting region. Light control means may be arranged and configured to controllably send pulsated light into the detecting region.

The bulk feeding means may comprise a vibration feeder or a conveyor belt, optionally in combination with a chute, whereby the objects are caused to fall through the detecting region. The bulk feeding means also comprise a translucent conveyor belt that extends into the detecting region and is arranged to at least partially support the object in the detecting region.

In one embodiment, the conveyor belt comprises a wire mesh conveyor belt, or two conveyor belts being separated by an intervening gap.

It is also provided a system for sorting objects, wherein the invented apparatus is combined with an expulsion device configured to controllably and selectively expel the object from the system based on properties of the light received by the first light-analyzing apparatus.

It is also provided a method of determining a parameter of at least one object, comprising the steps of
i) causing the object to move in a plane in a detecting region;
ii) illuminating the object with incident light;
iii) detecting light that has been transmitted through the object and is falling in a measuring plane; and
iv) determining an object-specific parameter based on the detected transmitted light falling in the measuring plane.

Moreover, it is also provided a method of determining a parameter of at least one object, comprising the steps of
i) causing the object to move in a plane (P-P) in a detecting region (D);
ii) illuminating the object with incident light having a first direction, which light is emitted from at least one light source;
iii) detecting and identifying light originating from said at least one light source and being transmitted through the object, said light having a second direction different from said first direction; and
iv) determining an object-specific parameter based on the detected transmitted light.

In one embodiment, the measuring plane for the transmitted light and the incident light are not in the same plane. The movement in step i) comprises free-falling or may be effected by a conveyor belt.

In one embodiment of the invented method, the illumination step comprises sending pulsating light towards the detecting region; and the detecting step additionally comprises detecting ambient light during time intervals where there is no light sent towards the detecting region.

The object-specific parameter may comprise one or more of the parameters on a list comprising: sugar content, acidity, ripeness, rot, mechanical damage, presence of foreign matter, presence of bone.

In one embodiment, the object is sorted based on the object-specific parameter determined in step iv).

The invention is not limited to near-infrared (NIR) spectroscopy or visible light (VIS) spectroscopy, but may generally be used with any spectroscopy method, also including, but not necessarily limited to, ultraviolet (UV) spectroscopy and mid-infrared (MIR) spectroscopy.

Further, what has been stated above in relation to the apparatus, may normally also be applied to the methods.

BRIEF DESCRIPTION OF THE DRAWINGS

These and other characteristics of the invention will become clear from the following description of a preferential form of embodiment, given as a non-restrictive example, with reference to the attached schematic drawings, wherein:

FIG. 2 is a side view of a second embodiment of the system according to the invention;

FIG. 3 is a side view of a third embodiment of the system according to the invention;

FIG. 4 is a side view of a fourth embodiment of the system according to the invention;

FIG. 5 is a side view of a fifth embodiment of the system according to the invention;

DETAILED DESCRIPTION OF A PREFERENTIAL EMBODIMENT

Figure 1A:
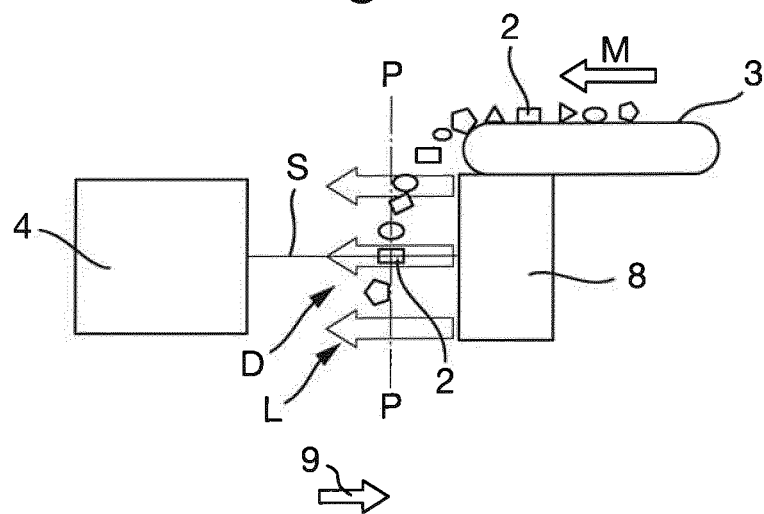
FIGS. 1a and 1b are a side view and a top view, respectively, of a first embodiment of the system according to the invention.

The following description will use terms such as "horizontal", "vertical", "lateral", "back and forth", "up and down", "upper", "lower", "inner", "outer", "forward", "rear", etc. These terms generally refer to the views and orientations as shown in the drawings and that are associated with a normal use of the invention. The terms are used for the reader's convenience only and shall not be limiting.

Figure 1B:
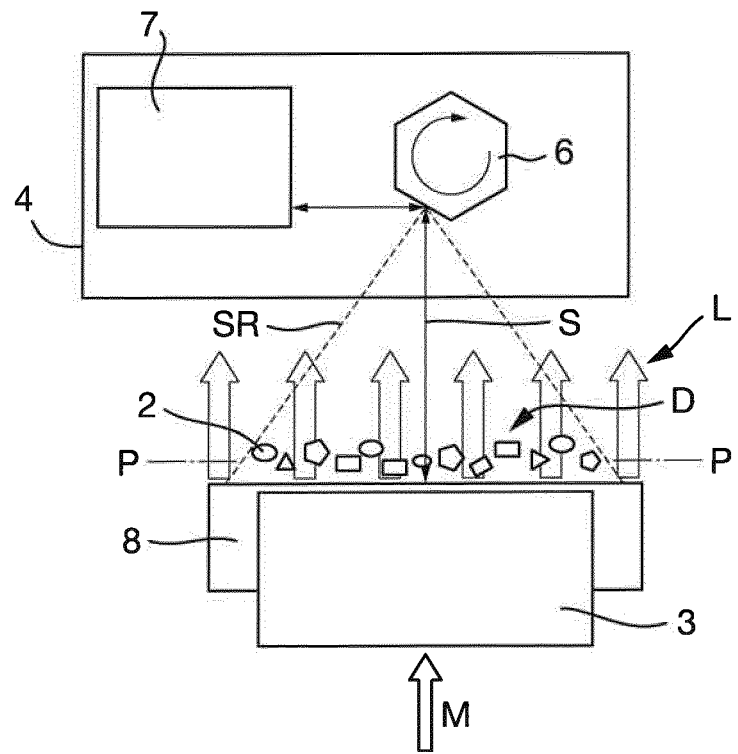

FIGS. 1a and 1b are a schematic representation of the system according to the invention. An illumination system 8 transmits light L towards a spectroscopy system 4. A conveyor 3 feeds a plurality of objects 2 (for example harvested fruit or vegetables) in the direction indicated by the arrow M such that the objects 2 subsequently fall off and (in a generally parabolic trajectory) down past an illuminated region defined between the illumination system and the spectroscopy system. Reference letter S denotes a scan line, reference letters P-P denote an object plane, and reference letters SR denote the scanning range. The objects 2 are thus illuminated from behind as they fall in the object plane in the detecting region D, and transmitted light is detected and analysed by the spectroscopy system 4.

The illumination system may comprise one or more light sources and ancillary devices (e.g. reflectors, lenses) capable of focusing the light in the object plane P-P. Thus, suitable light sources may include supercontinuum lasers, broadband light sources such as halogen bulbs, or one or more light-emitting diodes (LEDs), in combination with suitable lenses or other focusing elements. One example of such focusing element is disclosed in EP 0 772 498 B1, describing an optical inspection system having lenses for directing light from source units, such as LEDs, onto the products passing through an inspection region. A light source may be e.g. single broadband LED, or an array of multiple LEDs, each having different spectral bandwidths.

The spectroscopy system 4 comprises in the illustrated embodiment a rotating mirror 6 and a sensor 7. This set-up produces a single spectrum for each point on the scan line S. It should be understood that the sensor may comprise e.g. a spectrometer or a hyperspectral camera system. The spectroscopy system may also utilize very sensitive spectrometer systems having e.g. avalanche-photodiodes (APD) or photomultiplier tubes (PMT), which are known in the art.

FIG. 2 is a schematic representation of a second embodiment of the system according to the invention. Reference number 3 indicates a bulk feeding device, such as conveyor belt or a vibration feeder and a chute; the function of which being to feed a plurality of objects such that they fall into the detecting region D. For clarity of illustration, only one object is illustrated in FIG. 2. However, it should be understood that several objects may fall in the detecting region D simultaneously, similar to the situation shown in FIGS. 1a, b. FIG. 2 illustrates a situation where an object 2 (e.g. a fruit or a vegetable) has fallen off the feeding device 3 and is falling in the detecting region D as indicated by the arrow G.

A light source 10 is arranged to send an incident light beam $I_1$ towards the object 2 which is falling in the object plane P-P. The line T indicates the transmitted light that is falling in the measuring plane (seen along the plane), i.e. the transmitted light T that is detected by the spectroscopy system 4. In other words, a portion of the incident light beam $I_1$ is transmitted through the object and thereafter detected/identified by the spectroscopy system 4, this portion is referred to as the transmitted and detected light. As can be seen in FIG. 2, the direction of the incident light $I_1$ is different from the direction of the transmitted and detected light $TD_1$. In more detail, the direction of the incident light may be equal to the direction of the center axis of the incident light; and the direction of the transmitted and detected light may be equal to the center axis of the transmitted and detected light.

When there is no object in the detection region, the light emitted or sent by the light source 10 will not be sensed by spectroscopy system 4, as the light emitted by the light source 10 will be sent outside the field of view of said spectroscopy system 4. In more detail, generally none or not more than a minor portion of the light sent from the light source will be sensed by spectroscopy system 4 due to e.g. scattering in the ambient atmosphere, when no object is present in the detection region. According to one example, at most 10% or at most 5% or at most 1% or at most 0.5% or at most 0.1% or at most 0.05% of the light sent from the light source 10, when no object is present in the detection region, is identified by spectroscopy system 4.

When an object is present in the detection region and irradiated by said light source 10, the light from the light source is diffusely transmitted through or refracted by said object before it reaches the sensor spectroscopy system 4. In more detail, more than 75% or more than 90% of this light from the light source that reaches the sensor of spectroscopy system 4, has been diffusely transmitted through or refracted by said object before it reaches the sensor of the light-analyzing apparatus.

According to one example, the light source 10 and focusing element 12 has a resulting optical axis (OA) directed in a first direction. Said first direction being outside the field of view of said spectroscopy system 4, in other words unrefracted light emitted along said first optical axis, is out-side the field of said spectroscopy system 4 and will not be sensed by the spectroscopy system 4.

In the spectroscopy system, the transmitted and detected light is being analysed in order to determine internal properties of the object. If these internal properties are outside predetermined tolerances, for example if the object has internal regions that are rotten or damaged, a command signal (control lines not shown) is sent to an ejection device 9 (which is arranged downstream of the detecting region D) which removes the object from the system. The ejection device 9, which is optional, may be any known mechanical ejection or removing device, such as a flap, mechanical fingers, air nozzles, etc.

The light source 10 and the spectroscopy system 4 are arranged such that the incident light $I_1$ and the measuring plane T are not aligned. The region DB, on the other side of the object 2 with respect to the spectroscopy system 4, is either void or comprises an optional dark reference element 61. Such reference element ensures that the spectroscopy system is not blinded if and when there are no objects in the detecting region.

In order to optimize the light intensity in the object plane, the light source 10 comprises in the illustrated embodiment a broadband light source, such as a halogen bulb, arranged inside a reflector 12 as shown in FIG. 2. Thus, with reference to FIGS. 1a, b, the illumination system 8 comprises in the embodiment illustrated in FIG. 2 the light source 10 and the reflector 12 in a lamp housing 42. The reflector 12 has the shape of a truncated ellipsoid (truncated parallel with ellipsoid minor axis), and the light source 10 is arranged at the truncated ellipsoid's first focus $f_1$. As every light beam emitted from the first focus $f_1$ of the truncated ellipsoid is reflected by the reflector to converge at the second focus $f'_1$, the system is designed such that the object plane P-P intersects the second focus $f'_1$. This ensures that the object 2 is irradiated with concentrated light when falling through the detecting region D. In other words, the light emitted from the light source 10 will first be converging to a focus $f'_1$, whereafter it will diverge. The light analyzing-apparatus is normally arranged such that the diverging light does not reach its sensor.

It should be understood that although FIG. 2 shows the object 2 falling vertically, along the object plane P-P, this is not a requirement for the invention. It is sufficient that the object intersects the second focus $f'_1$ and the object plane in the detecting region D; i.e. the object may have a non-vertical trajectory.

FIG. 3 is a schematic representation of a third embodiment of the system according to the invention. Only aspects that differ from those described above with reference to FIG. 2 will be discussed in the following. In this third embodiment, a second light source 20 and a corresponding second truncated ellipsoid-shaped reflector 22 are arranged similarly to the first light source 10 and first reflector 12 as described above, inside a lamp housing 42, with the second light source 20 at the truncated ellipsoid's first focus $f_2$. The second reflector 20 and the first reflector 10 are arranged symmetrically about a common central axis C, and the second reflector 20 is (like the first reflector 10) arranged such that the object plane P-P intersects the second focus $f'_2$ of the second reflector. Thus, the second foci $f'_1$, $f'_2$ coincide and lie in the object plane P-P, as illustrated in FIG. 3. This embodiment effectively doubles the irradiation intensity on the object 2, compared to the embodiment illustrated in FIG. 2.

The first and second light sources 10, 20 send their respective first and second light beams $I_1$, $I_2$ towards the object 2 which is falling in the object plane P-P. Transmitted light falling in the measuring plane T is detected by the spectroscopy system 4 as described above. In other words, a portion of the incident light beam $I_1$ and a portion of the incident light beam $I_2$ are transmitted through the object and thereafter detected by the spectroscopy system 4, these portions are referred to as the transmitted and detected light. As can be seen in FIG. 3, the directions of the incident light beams $I_1$, $I_2$ are different from the direction of the transmitted and detected light $TD_{1,2}$. In more detail, the direction of an incident light beams may be equal to the direction of the center axis of the incident light beam; and the direction of the transmitted and detected light may be equal to the center axis of the transmitted and detected light.

A dark reference element 61 is arranged between the reflectors 12, 22, ensuring that the spectroscopy system is not blinded if and when there are no objects in the detecting region D. In a practical embodiment, the reflectors and their respective light sources may be incorporated into a single lamp housing 42. Thus, with reference to FIGS. 1a, b, the illumination system 8 comprises in the embodiment illustrated in FIG. 2 the light sources 10, 20, the reflectors 12, 22 and the reference element 61 in the housing 42.

FIGS. 2 and 3 also show an optional white reference element 43 arranged inside the lamp housing 42 but within the scan range of the spectroscopy system 4. The white reference element 43 makes it possible to calibrate the system while it is in operation, which could improve measurement accuracy. The white reference element may for example be a small barium pyramid, placed such that it is illuminated by the light source(s).

FIG. 4 is a schematic representation of a fourth embodiment of the system according to the invention. The lamp housing has been omitted in this illustration. Only aspects that differ from those described above with reference to FIG. 3 will be discussed in the following.

In this fourth embodiment, the dark reference element (reference number 61 in FIG. 3) has been replaced by a opening (or light guide) 62 between the reflectors 12, 22, and a second spectroscopy system 5 is arranged collinearly with the first spectroscopy system 4. As the first and second incident light beams $I_1$, $I_1$ are sent towards the object 2, a portion T is transmitted and sent to the first spectroscopy system 4. However, a portion of the incident light is also reflected (indicated by $R_{1,2}$) towards the second spectroscopy system 5. This configuration thus allows for both transmission spectroscopy (in the first spectroscopy system 4), and reflection spectroscopy (in the second spectroscopy system 5).

The fourth embodiment also comprises a third light source 30 and an optical filter 63 arranged to send a third incident light beam $I_3$ towards the object 2. The optical filter 63 is configured to block light of wavelengths that would otherwise interfere with the transmitted light falling in the measuring plane T. Thus, the third incident (filtered) light beam $I_3$ is reflected by the object 2 and a reflected light R3 is directed to the first spectroscopy system 4. This third light source 30 enables the measurement and evaluation of the object's surface properties. It should be understood that a plurality of light sources similar to the third light source 30 may included, e.g. symmetrically on the other side of the first spectroscopy system 4.

FIG. 5 is a schematic representation of a fifth embodiment of the system according to the invention. This embodiment is essentially a combination of the third and fourth embodiments. The lamp housing has been omitted in this illustration. The dark reference element 61 is arranged between the first and second reflectors 12, 22 as described above with reference to FIG. 3, and the third light source 30 and optical filter 63 are arranged as described above with reference to FIG. 4.

Figure 6:
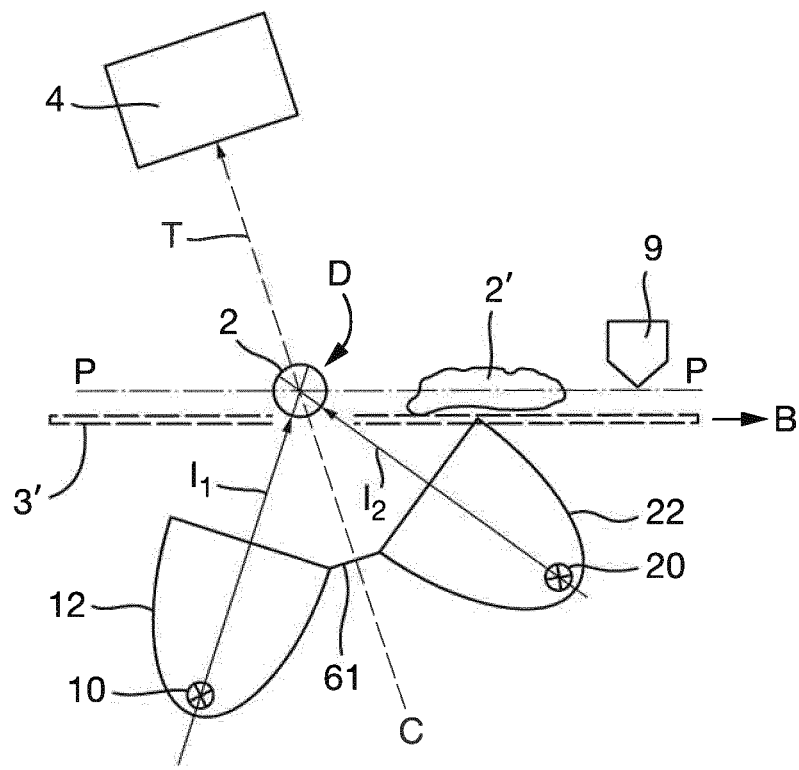
FIG. 6 is a side view illustrating another variant of the invention.

FIG. 6 shows a variant where the invented system is arranged such that the object 2 is not falling in the object plane (as in the embodiments of the invention described above), but is carried through the detecting region D on a conveyor belt 3' moving in the direction B. The conveyor belt 3', which is aligned with the object plane P-P, is transparent and/or translucent such that the light beams $I_{1,2}$ are allowed to pass through the belt and onto the object. The conveyor belt 3' may thus for example be a wire mesh conveyor belt, a translucent conveyor belt, or two conveyor belts arranged with an intervening gap. The set-up shown in FIG. 6 allows the invented system to be used for analysing and sorting objects that do not lend themselves to being dropped, for example meat products. Examples of such meat products are chicken, pork belly and ground meat. The set-up is also suitable for detecting, analysing and sorting objects that have lesser defined shapes and are capable of forming a layer or lumps on the conveyor belt 3', such as ground beef, minced meat, meat farce, etc. This type of object is indicated by reference number 2' in FIG. 6. It should be understood that the set-up of FIG. 6 could be reversed, i.e. the light sources being above the conveyor belt 3' and the spectroscopy system below.

Figure 7:
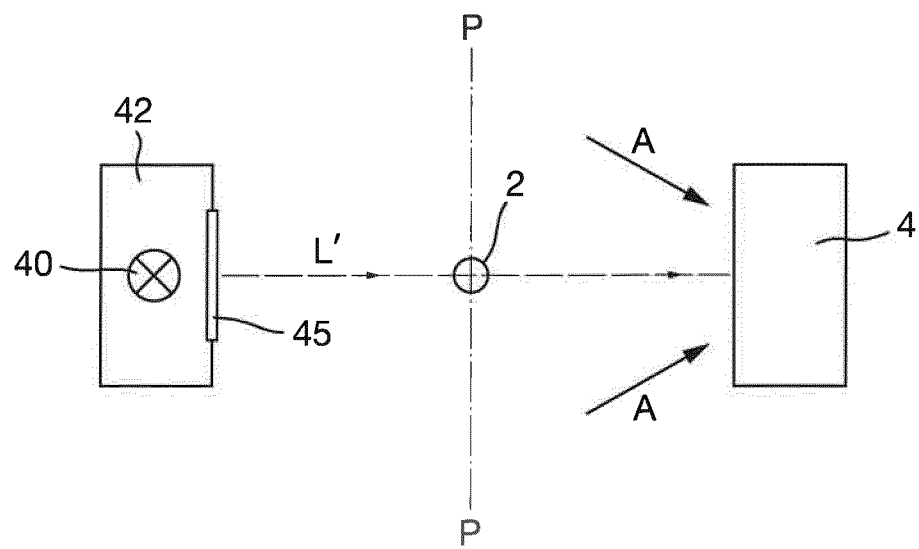
FIG. 7 shows an arrangement where light from the lamp housing is pulsed.

In use, any of the embodiments of the invented system and apparatus may typically be installed in industrial environments, e.g. adjacent to produce packing equipment or in meat processing plants, where conditions for conducting optical detection processes may be less than ideal. For example, the light detected by the spectroscopy system is generally the sum of (i) light generated by the light sources that has been transmitted through the object, and (ii) ambient light. This is illustrated in FIG. 7, where arrows marked "A" indicate ambient light, and L' represents pulsating light coming from a pulsed light source 40 in a lamp housing 42.

The ambient light may constitute a significant portion of the detected light and may affect the detection process in an adverse manner. It is therefore of interest to be able to factor ambient light out of the detection and measurement process.

The invention therefore comprises a method and associated means for switching off the light source(s) for a period of time such that the spectroscopy system may measure only ambient light. When the light source is switched off, no light is transmitted through the object. A processing device (not shown) in the spectroscopy system 4 subtracts the ambient light measurement from the measurement made by the spectroscopy system when light generated by the illumination system (the light sources) is transmitted through the object.

The objects are typically moving (e.g. falling) through the detecting region at a high speed; and the time periods in which the light source is switched off must match this speed. This may be obtained by pulsed focused LEDs, which enable a rapid on/off cycle. A pulsed LED arrangement enables the detection of received light from neighbouring pixels when the light source is off (only ambient light) and on (generated light+ambient light). If the light source is e.g. a halogen bulb (having longer response times), the pulsated light L' may be obtained by arranging a light control means 45 in front of the light source, as shown in FIG. 7. The light control means 45 may be e.g. a mechanical shutter or so-called switchable glass. Switchable glasses are well known, one example being SmartGlass™, which is marketed and sold by Schott AG.

This ability to measure and subtract ambient light during the detection process improves the versatility of the system. For example, the detecting region does not need to be in an enclosed cabinet, but may be in the open and exposed to ambient light. It should be understood that pulsed LEDs may be combined with the light control means 45.

Although the invention has been described with reference to detecting matter in fruits, vegetables and meat, it should be understood that the invention is equally applicable to detecting matter in translucent objects in general, including but not limited to other foodstuffs.

The invention claimed is:

1. An apparatus for detecting matter, comprising:

bulk feeding means configured for feeding a plurality of objects into a detecting region, the bulk feeding means feeding the plurality of objects into the detecting region in a random fashion where the plurality of objects define an object plane when moving through the detecting region;

at least one light source, each light source being selected from a group comprising broad band lamps, broad band LEDs, arrays of LEDs, and combinations thereof, each light source having a focusing element and being configured to send light in a respective first direction for illuminating at least one object moving in the object plane in the detecting region; and a first light-analyzing apparatus comprising a spectroscopy system or a hyperspectral camera system arranged to sense light that has been emitted from said at least one light source and transmitted through or refracted by the at least one object moving in the object plane in the detecting region, and to identify an amount of light that has been received from said at least one light source after transmission through the object and arranged to discriminate between ambient light and said light received from said at least one light source, wherein said first light-analyzing apparatus and said at least one light source are arranged on opposite sides of the object plane in the detecting region, wherein said first light-analyzing apparatus is arranged to only sense light having a direction within a field-of-view of said first light-analyzing apparatus, and means for pulsing the light sent by the light source, wherein the pulsing comprises switching off or blocking the at least one light source for time intervals including a period of time where there is no light sent towards the detecting region such that the first light-analyzing apparatus measures only the ambient light during said period of time, such that the apparatus is configured to measure and subtract ambient light during detection;

wherein said first light-analyzing apparatus is arranged with respect to the first direction so that light being sent along the first direction from said at least one light source will not reach the field-of-view of said first light-analyzing apparatus, and wherein when no object is in the detecting region, the light sent by the at least one light source is not sensed by the light-analyzing apparatus, and wherein said respective first direction is different from the directions within the field-of view of said first light-analyzing apparatus so that the first light-analyzing apparatus receives only the light having been transmitted through or refracted by the at least one object moving in the object plane.

2. The apparatus of claim 1, wherein the at least one light source is arranged in a first focus of a truncated ellipsoid-shaped reflector and the reflector is arranged such that a truncated ellipsoid-shaped reflector second focus is coinciding with the object plane.

3. The apparatus of claim 1, wherein the at least one light source comprises one or more light emitting diodes (LEDs).

4. The apparatus of claim 1, wherein the at least one light source further comprises at least one lens, capable of focusing the light in the object plane.

5. The apparatus of claim 1, wherein a first light source is arranged symmetrically with a second light source about a central axis.

6. The apparatus of claim 5, wherein a second light-analyzing apparatus is arranged on an opposite side of the object plane with respected to the first light-analyzing apparatus and is configured to receive reflected light from the object resulting from light sent from the respective first and second light sources.

7. The apparatus of claim 1, further comprising at least a third light source arranged on the same side of the object plane as the first light-analyzing apparatus and configured to irradiate the object with light that is reflected to the first light-analyzing apparatus.

8. The apparatus of claim 1, wherein the at least one light source is a pulsed light source arranged to send pulsated light into the detecting region.

9. The apparatus of claim 1, further comprising light control means arranged and configured to controllably send pulsated light into the detecting region.

10. The apparatus of claim 1, wherein the bulk feeding means comprises a vibration feeder or a conveyor belt, optionally in combination with a chute, whereby the objects are caused to fall through the detecting region.

11. The apparatus of claim 1, wherein the bulk feeding means comprises a translucent conveyor belt that extends into the detecting region and is arranged to at least partially support the object in the detecting region.

12. The apparatus of claim 11, wherein the conveyor belt comprises a wire mesh conveyor belt, or two conveyor belts being separated by an intervening gap.

13. A system for sorting objects comprising the apparatus as defined by claim 1; and
an expulsion device configured to controllably and selectively expel an object of the plurality of objects from the system based on properties of the light received from the at least one light source by the first light-analyzing apparatus.

14. The apparatus of claim 1, wherein the bulk feeding means comprises a conveyor belt or a chute.

15. A method of determining a parameter of at least one object, comprising the steps of
i) causing the object to move in an object plane in a detecting region using bulk feeding means to feed the object into the detecting region in a random fashion;
ii) illuminating the object with incident light using at least one light source;
iii) detecting light emitted from a light source being selected from a group comprising broad band lamps, broad band LEDs, arrays of LEDs, and combinations thereof, the detected light having been transmitted through or refracted by the object moving in a measuring plane in the detecting region, wherein when no object is in the detecting region, the light sent by the at least one light source is not detected,
wherein the illumination step ii) comprises pulsing the light sent by the light source, wherein the pulsing comprises switching off or blocking the at least one light source for time intervals including a period of time where there is no light sent towards the detecting region; and the detecting step iii) additionally comprises detecting ambient light (A) during the time intervals where there is no light sent towards the detecting region;
iv) discriminating said detected and identified light from the detected ambient light; and
v) determining an object-specific parameter based on the detected transmitted light falling in the measuring plane based on a spectroscopy system or a hyperspectral camera system,
wherein the spectroscopy system or the hyperspectral camera and the at least one light source are arranged on opposite sides of the object plane in the detecting region, and
wherein the spectroscopy system or the hyperspectral camera is arranged relative to the at least one light source so that light sent along a light emitting direction from the at least one light source will not reach the spectroscopy system or the hyperspectral camera unless the light has been transmitted through or refracted by the at least one object moving in the object plane.

16. The method of claim 15, wherein the movement in step i) comprises free-falling.

17. The method of claim 15, wherein the movement in step i) is effected by a conveyor belt.

18. The method of claim 15, wherein the object-specific parameter comprises one or more of the parameters on a list comprising: sugar content, acidity, ripeness, rot, mechanical damage, presence of foreign matter, presence of bone.

19. The method of claim 15, wherein the object is sorted based on the object-specific parameter determined in step iv).

20. A method of determining a parameter of at least one object, comprising the steps of
i) causing the object to move in an object plane in a detecting region using bulk feeding means to feed the object into the detecting region in a random fashion;
ii) illuminating the object with incident light having a first direction, which light is emitted from at least one light source;
iii) detecting and identifying light originating from said at least one light source and being transmitted through or refracted by the object, said at least one light source being selected from a group comprising broad band lamps, broad band LEDs, arrays of LEDs, and combinations thereof, the detected light having been transmitted or refracted in a second direction different from said first direction, wherein when no object is in the detecting region, the light sent by the at least one light source is not detected,
wherein the illumination step ii) comprises pulsing the light sent by the light source, wherein the pulsing comprises switching off or blocking the at least one light source for time intervals including a period of time where there is no light sent towards the detecting region; and the detecting step iii) additionally comprises detecting ambient light (A) during the time intervals where there is no light sent towards the detecting region
wherein the light originates from the at least one light source arranged on one side of the object plane and the light is detected on a side opposite the one side of the object plane,
wherein the spectroscopy system or the hyperspectral camera is arranged relative to the at least one light source so that light sent along the first direction from the at least one light source will not reach the spectroscopy system or the hyperspectral camera unless the light has been transmitted through or refracted by the at least one object moving in the object plane;
iv) discriminating said detected and identified light from the detected ambient light; and
v) determining an object-specific parameter based on the detected light based on a spectroscopy system or a hyperspectral camera system.

* * * * *